US011886214B2

(12) United States Patent
Vogt et al.

(10) Patent No.: US 11,886,214 B2
(45) Date of Patent: Jan. 30, 2024

(54) LOW-DROPOUT VOLTAGE REGULATION DEVICE HAVING COMPENSATION CIRCUIT TO COMPENSATE FOR VOLTAGE OVERSHOOTS AND UNDERSHOOTS WHEN CHANGING BETWEEN ACTIVITY MODE AND STANDBY MODE

(71) Applicant: STMicroelectronics SA, Montrouge (FR)

(72) Inventors: Lionel Vogt, La Rochette (FR); Eoin Padraig O Hannaidh, Laval (FR)

(73) Assignee: STMicroelectronics SA, Montrouge (FR)

( * ) Notice: Subject to any disclaimer, the term of this patent is extended or adjusted under 35 U.S.C. 154(b) by 55 days.

(21) Appl. No.: 17/393,658

(22) Filed: Aug. 4, 2021

(65) Prior Publication Data

US 2021/0365059 A1 Nov. 25, 2021

Related U.S. Application Data

(62) Division of application No. 16/438,206, filed on Jun. 11, 2019, now Pat. No. 11,112,812.

(30) Foreign Application Priority Data

Jun. 19, 2018 (FR) ....................................... 1855365

(51) Int. Cl.
*G05F 1/575* (2006.01)
*G05F 1/565* (2006.01)

(52) U.S. Cl.
CPC .............. *G05F 1/575* (2013.01); *G05F 1/565* (2013.01)

(58) Field of Classification Search
CPC . G05F 1/46; G05F 1/461; G05F 1/462; G05F 1/467; G05F 1/56; G05F 1/563;
(Continued)

(56) References Cited

U.S. PATENT DOCUMENTS

| | | | |
|---|---|---|---|
| 7,907,074 | B2 | 3/2011 | Zanchi et al. |
| 10,199,932 | B1 | 2/2019 | Hastings |

(Continued)

FOREIGN PATENT DOCUMENTS

| | | |
|---|---|---|
| CN | 106774578 A | 5/2017 |

OTHER PUBLICATIONS

S. Lai et al. , "A Power-Efficient On-Chip Linear Regulator Assisted by Switched Capacitors for Fast Transient Regulation", IEEE, 2013, pp. 682-688. (Year: 2013).*

(Continued)

*Primary Examiner* — Thienvu V Tran
*Assistant Examiner* — Carlos O Rivera-Perez
(74) *Attorney, Agent, or Firm* — Crowe & Dunlevy

(57) ABSTRACT

A low-dropout regulator includes a power stage having an output terminal coupled to a load circuit operable in different operating modes in which it receives different output currents. An error amplifier has a first input coupled to a reference voltage and an output coupled to an input terminal of the power stage. A compensation circuit includes a first stage with an RC filter coupled to the input terminal of the power stage, and generating an initial compensation voltage. A second stage includes a first transistor coupled between a supply voltage and a second node, and controlled by a complementary control signal, a high-side capacitor coupled between the second node and ground, and a third transistor coupled between the initial compensation voltage and the second node, and controlled by a control signal representative of the current operating mode of the load circuit.

19 Claims, 3 Drawing Sheets

(58) Field of Classification Search
CPC ........ G05F 1/565; G05F 1/575; H02M 3/156; H02M 3/1566; H02M 1/0003; H02M 1/0016; H02M 1/0019; H02M 1/0025; H02M 1/0032; H02M 1/0035
USPC ................ 323/222–226, 266, 269–275, 280, 323/282–285, 288, 304, 311–317, 351
See application file for complete search history.

(56) References Cited

U.S. PATENT DOCUMENTS

| | | | | |
|---|---|---|---|---|
| 11,112,812 | B2 * | 9/2021 | Vogt | G05F 1/575 |
| 2006/0055420 | A1 | 3/2006 | Luo | |
| 2012/0038332 | A1 * | 2/2012 | Lin | G05F 1/575 323/277 |
| 2015/0050900 | A1 | 2/2015 | Zhang | |
| 2015/0205314 | A1 * | 7/2015 | Hayashi | G05F 1/56 323/217 |
| 2017/0163218 | A1 | 6/2017 | Gorbachov et al. | |
| 2018/0164843 | A1 | 6/2018 | Luo et al. | |
| 2021/0021270 | A1 * | 1/2021 | Zhan | G05F 1/561 |

OTHER PUBLICATIONS

INPI Search Report and Written Opinion for FR 1855365 dated Feb. 21, 2019 (12 pages).

* cited by examiner

LOW-DROPOUT VOLTAGE REGULATION DEVICE HAVING COMPENSATION CIRCUIT TO COMPENSATE FOR VOLTAGE OVERSHOOTS AND UNDERSHOOTS WHEN CHANGING BETWEEN ACTIVITY MODE AND STANDBY MODE

PRIORITY CLAIM

This application is a division of U.S. application for patent Ser. No. 16/438,206, filed Jun. 11, 2019, which claims the priority benefit of French Application for Patent No. 1855365, filed on Jun. 19, 2018, the contents of which are hereby incorporated by reference in their entireties to the maximum extent allowable by law.

TECHNICAL FIELD

Embodiments relate to low-dropout voltage regulation devices ('LDO': 'Low DropOut voltage regulator') and more particularly to the management of transient voltage responses upon changes of the different operating modes of a load circuit connected at the output of the LDO.

BACKGROUND

Generally, a voltage regulation device is configured to deliver, in an ideal case, to the output of the device, an output voltage that is shifted in comparison to the input voltage, regardless of the load that is coupled to the output of the device. A low-dropout voltage regulation device is configured to deliver an output voltage having a shift that is small in comparison to the input voltage.

In practice, the load may vary to a large extent. This is all the more true in the case of a digital load, which may regularly switch between what is termed an activity mode (or 'active mode'), requiring a relatively high output current, for example of the order of a few μA or even a few mA, and what is termed a standby mode (or 'retention mode'), requiring a low output current, for example of the order of a few nA.

On account of this, such a sharp change in the output current will cause the output voltage delivered by the low-dropout voltage regulation device to vary, even if the device generally has an error amplifier configured to compensate the influence of this variation in the load circuit of the device.

Changing from standby mode to activity mode leads to a large undershoot of the output voltage, whereas changing from activity mode to standby mode leads to a large overshoot of the output voltage. The undershoots or overshoots form transient responses to the variation in the load.

One conventional solution involves using a compensation circuit coupled to the error amplifier, so as to attenuate the undershoots and overshoots of the output voltage.

However, a conventional compensation circuit is not generally able to be designed to satisfactorily attenuate the transient responses both upon the change from standby mode to activity mode and upon the change from activity mode to standby mode.

What is more, a compensation circuit tailored to the load value of the load circuit in activity mode probably leads to a stability problem for the load circuit in standby mode, and reduces the energy efficiency of the device at the expense of an increase in currents flowing through the error amplifier.

Such a conventional compensation circuit is normally designed only for compensating the transient response to the variation in the load value of the load circuit upon the change from activity mode to standby mode, and the performance of the regulation device is therefore not optimized.

SUMMARY

Thus, according to one embodiment, what is proposed is a technical approach with low energy consumption and low complexity that allows fast transient responses to the variation in the load value of a load of a low-dropout voltage regulation device upon bidirectional changes between two different operating modes of the load, for example between an activity mode and a standby mode of the load.

According to one aspect, what is proposed is a low-dropout (LDO) voltage regulation device. The LDO device includes a power stage having an output terminal intended to be coupled to a load circuit having several operating modes involving delivery of different respective output currents to the output terminal, an error amplifier whose output is coupled to the input terminal of the power stage, and a compensation circuit coupled to the input terminal.

In this device, the compensation circuit is able to switch its configuration between several configurations that are respectively tailored to the operating modes. The configurations are able to be selected by a control signal representative of the operating mode of the load circuit.

Such a regulation device advantageously makes it possible to obtain, for each change between operating modes of the load circuit of the device, a dedicated and specifically tailored configuration.

Also, this configuration selection is made on the basis of a control signal representative of the current operating mode of the load circuit.

For example, this control signal may be emitted by the load circuit itself or by an ancillary circuit that is able to drive the load circuit.

By way of example, this control signal may be an 'on'/'off' signal that is intended to activate the load circuit or stop/standby the load circuit.

According to one embodiment, the load circuit has a first operating mode, for example an activity mode, desiring a first output current, and a second operating mode, for example a standby or retention mode, desiring a second output current. The first output current is higher than the second output current, and the compensation circuit has a first configuration tailored to the first operating mode and a second configuration tailored to the second operating mode of the load circuit.

In the first configuration, the compensation circuit may, for example, be configured to attenuate the variations in the voltage at the output terminal upon the change from the second operating mode to the first operating mode, and precharge an initial compensation voltage able to be used upon the change from the first operating mode to the second operating mode.

In the second configuration, the compensation circuit may, for example, be configured to apply the initial compensation voltage to the input terminal upon the change from the first operating mode to the second operating mode.

It should be noted that the value of the initial compensation voltage is, for example, approximately equal to the appropriate voltage of the input terminal of the power stage for the load circuit in standby mode.

In other words, the precharged initial compensation voltage in the first configuration allows the power stage, in the second configuration, to obtain, virtually instantaneously, the output voltage expected in response to the changing of the load circuit to the second operating mode at the input terminal, so as to reduce the time to establish the change from the first to the second operating mode.

According to another embodiment, the compensation circuit includes a first compensation stage with a compensation resistor and a first compensation capacitor that are coupled in series between the input terminal and ground, the value of the first compensation capacitor being tailored so as to smooth the variations in the voltage at the output terminal on its own based upon the change from the second operating mode to the first operating mode, and a second compensation stage. The second compensation stage includes at least one second compensation capacitor configured in the first configuration, to be decoupled from the input terminal and charge the at least one second compensation capacitor so as to precharge the initial compensation voltage, and in the second configuration, to be coupled to the input terminal and deliver, to the input terminal, the initial compensation voltage.

It should be noted that the value of the first compensation capacitor or of the combination of the first and second compensation capacitors is chosen so as to help ensure the regulation loop stability of the low-dropout voltage regulation device.

By way of non-limiting indication, the power stage includes an n-type power transistor whose gate is coupled to the input terminal. The error amplifier includes a first input coupled to a reference voltage and a second input coupled to the source of the power transistor, and the precharged initial compensation voltage is of the order of the sum of the reference voltage and the threshold voltage of the power transistor.

The second compensation stage may, for example, furthermore include an additional transistor identical to the power transistor or having a channel length/channel width ratio identical to or within a given ratio with respect to that of the power transistor.

The second compensation stage may, for example, include a second compensation capacitor coupled between the gate of the additional transistor and ground.

The source and the drain of the additional transistor may, for example, be coupled, respectively, to the load circuit and to a current source configured to deliver, when the control signal is representative of the first operating mode, a reference current of the same order of magnitude as the leakage current of the load circuit in the second operating mode of the load circuit.

As a variant, the second compensation stage may, for example, include a second compensation capacitor and a third compensation capacitor that are intended in the first configuration, to receive a charging voltage and the ground voltage, respectively, or in the second configuration, to both be coupled to the input terminal.

According to one embodiment, the charging voltage is a supply voltage of the device.

As a variant, the charging voltage is the voltage present at the input terminal when the load circuit is in the first operating mode.

According to yet another embodiment, the low-dropout voltage regulation device is produced in an integrated manner.

According to another aspect, what is proposed is an electronic system, including a low-dropout (LDO) voltage regulation device such as defined above and a load circuit coupled to the LDO device.

According to one embodiment, the load circuit is a digital load circuit.

According to yet another aspect, what is proposed is an electronic apparatus, for example of tablet or cellular module telephone type, incorporating at least one system such as defined above.

Disclosed herein is a low-dropout voltage regulation device, including: a power stage having an output terminal configured to be coupled to a load circuit, the load circuit being operable in a plurality of operating modes, the load circuit being configured to receive a different respective output current when in each operating mode of the plurality of operating modes; an error amplifier having a first input coupled to a reference voltage, a second input, and an output coupled to an input terminal of the power stage; and a compensation circuit. The compensation circuit includes: a first compensation stage including an RC filter coupled to the input terminal of the power stage, and generating an initial compensation voltage; and a second compensation stage. The second compensation stage includes: a first transistor coupled between a supply voltage and a second node, the first transistor having a control terminal coupled to a complementary control signal; a high-side capacitor coupled between the second node and ground; and a third transistor coupled between the initial compensation voltage and the second node, the third transistor having a control terminal coupled to a control signal, the complementary control signal being a complement of the control signal, wherein the control signal is representative of a current operating mode of the load circuit.

The second compensation stage may include: a second transistor coupled between a first node and the initial compensation voltage, the second transistor having a control terminal coupled to the control signal; and a low-side capacitor coupled between the first node and ground.

The second compensation stage may also include an auxiliary transistor coupled between the first node and ground, the auxiliary transistor having a control terminal coupled to the control signal.

The control signal is at a logic high when the load circuit is in a first operation mode, the first operation mode being an activity mode, and the control signal is at a logic low when the load circuit is in a second operation mode, the second operation mode being a standby mode.

The RC filter may include a compensation resistor and a first compensation capacitor that are coupled in series between the input terminal of the power stage and ground, the first compensation capacitor having a capacitance value that smooths variations in a voltage at an output terminal of the power stage that occur upon change from the second operating mode to the first operating mod.

The power stage may include a power transistor having a gate that is coupled to the input terminal of the power stage. The second input of the error amplifier may be coupled to a conduction terminal of the power transistor, and wherein the initial compensation voltage is approximately a sum of the reference voltage and a threshold voltage of the power transistor.

Also disclosed herein is a low-dropout voltage regulation device, including: a power stage having an output terminal configured to be coupled to a load circuit, the load circuit being operable in a plurality of operating modes, the load circuit being configured to receive a different respective output current when in each operating mode of the plurality of operating modes; an error amplifier having a first input coupled to a reference voltage, a second input, and an output coupled to an input terminal of the power stage; and a compensation circuit. The compensation circuit includes: a first compensation stage including an RC filter coupled to the input terminal of the power stage, and generating an initial compensation voltage; and a second compensation stage. The second compensation stage includes: a buffer coupled between the input terminal of the power stage and a second node; a high-side capacitor coupled between the second node and ground; and a third transistor coupled between the initial compensation voltage and the second node, the third transistor having a control terminal coupled to a control signal, wherein the control signal is representative of a current operating mode of the load circuit.

The second compensation stage may include: a second transistor coupled between a first node and the initial compensation voltage, the second transistor having a control terminal coupled to the control signal; and a low-side capacitor coupled between the first node and ground.

The second compensation stage may include an auxiliary transistor coupled between the first node and ground, the auxiliary transistor having a control terminal coupled to the control signal.

The control signal may be at a logic high when the load circuit is in a first operation mode, the first operation mode being an activity mode, and the control signal may be at a logic low when the load circuit is in a second operation mode, the second operation mode being a standby mode.

The RC filter may include a compensation resistor and a first compensation capacitor that are coupled in series between the input terminal of the power stage and ground, the first compensation capacitor having a capacitance value that smooths variations in a voltage at an output terminal of the power stage that occur upon change from the second operating mode to the first operating mod.

The power stage may include a power transistor having a gate that is coupled to the input terminal of the power stage. The second input of the error amplifier may be coupled to a conduction terminal of the power transistor, and the initial compensation voltage may be approximately a sum of the reference voltage and a threshold voltage of the power transistor.

Also disclosed herein is a low-dropout voltage regulation device, including: a power stage having an output terminal configured to be coupled to a load circuit, the load circuit being operable in a plurality of operating modes, the load circuit being configured to receive a different respective output current when in each of the plurality of operating modes; an error amplifier having an output coupled to an input terminal of the power stage; and a compensation circuit coupled to the input terminal of the power stage, wherein the compensation circuit is operable in a plurality of selectable configurations that are respectively tailored to the plurality of operating modes, the plurality of selectable configurations being selectable in response to a control signal representative of a current operating mode of the load circuit. The plurality of operating modes of the load circuit include a first operating mode in which the load circuit is intended to receive a first output current and a second operating mode in which the load circuit is intended to receive a second output current. The plurality of selectable configurations of the compensation circuit include a first configuration tailored to the first operating mode of the load circuit and a second configuration tailored to the second operating mode of the load circuit. In the first configuration, the compensation circuit is configured to attenuate variations in voltage at the output terminal of the power stage that occur upon a change from the second operating mode to the first operating mode, and to precharge an initial compensation voltage able to be usable upon change from the first operating mode to the second operating mode. In the second configuration, the compensation circuit is configured to apply the initial compensation voltage to the input terminal of the power stage upon the change from the first operating mode to the second operating mode. The compensation circuit includes: a first compensation stage including a compensation resistor and a first compensation capacitor that are coupled in series between the input terminal of the power stage and ground, the first compensation capacitor having a capacitance value that smooths variations in the voltage at the output terminal of the power stage that occur upon the change from the second operating mode to the first operating mode; and a second compensation stage including at least one second compensation capacitor and being configured: in the first configuration, to be decoupled from the input terminal of the power stage and charge the at least one second compensation capacitor so as to precharge the initial compensation voltage, and in the second configuration, to be coupled to the input terminal of the power stage and deliver, to the input terminal, the initial compensation voltage. The power stage includes a power transistor having a gate is coupled to the input terminal of the power stage. The error amplifier includes a first input coupled to a reference voltage and a second input coupled to a conduction terminal of the power transistor, and the precharged initial compensation voltage is approximately a sum of the reference voltage and a threshold voltage of the power transistor. The power transistor of the power stage is an n-channel power transistor, and the conduction terminal to which the second input of the error amplifier is coupled includes a source of the n-channel power transistor. The second compensation stage includes a second compensation capacitor and a third compensation capacitor that are configured, in the first configuration, to receive a charging voltage and ground, respectively, and, in the second configuration, to both be coupled to the input terminal of the power stage.

The second compensation stage may further include an additional transistor, the second compensation stage includes a single second compensation capacitor coupled between a gate of the additional transistor and ground, and a source and a drain of the additional transistor are coupled, respectively, to the load circuit of the low-dropout voltage regulation device and to a current source configured to deliver, when the control signal is representative of the first operating mode, a reference current of a same order of magnitude as a leakage current of the load circuit in the second operating mode of the load circuit of the low-dropout voltage regulation device.

The additional transistor may be identical to the power transistor.

The additional transistor may have a channel length/channel width ratio identical to that of the power transistor.

The additional transistor may have a channel length/channel width ratio within a given threshold of a channel length/channel width ratio of the power transistor.

The charging voltage may be a supply voltage of the low-dropout voltage regulation device.

The charging voltage may be a voltage present at the input terminal of the power stage when the load circuit is in the first operating mode.

The low-dropout voltage regulation device may be produced in an integrated manner.

BRIEF DESCRIPTION OF THE DRAWINGS

Other advantages and features will become apparent upon examining the detailed description of completely non-limiting embodiments and the appended drawings, in which.

DETAILED DESCRIPTION

Figure 1:
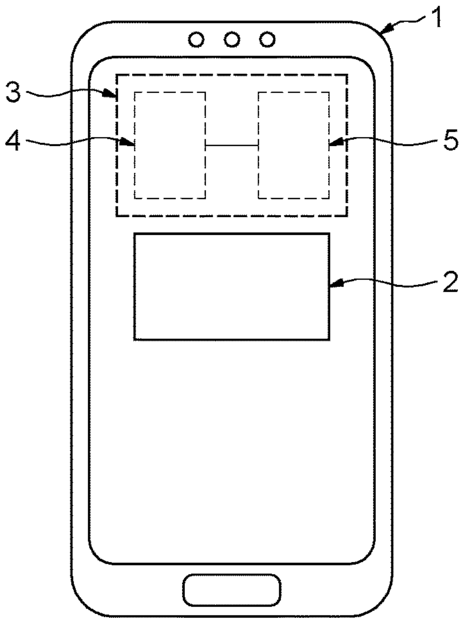
FIG. 1 is a block diagram is an electronic device disclosed herein containing a low dropout amplifier.

The reference 1 in FIG. 1 denotes an electronic apparatus, in this case, for example, a cellular mobile telephone. By way of non-limiting example, this cellular mobile telephone 1 may be a smartphone.

The mobile telephone 1 is supplied by an integrated or removable battery 2, and includes several electronic systems, such as a communication system, detection system, and a processing system.

For the sake of simplicity, FIG. 1 illustrates the communication system 3 configured to use wireless communications, in this case, for example, wireless communications based on the following technologies: Wi-Fi (IEEE 802.11, ‘Wireless Fidelity’), ‘Bluetooth’ and near-field communication (NFC).

In order to ensure operation of the wireless communications, the communication system 3 includes a processing module 4 produced in this case, for example, in the form of a digital circuit, and a low-dropout voltage regulation device 5 coupled between the battery 2 and the processing module 4 so as to deliver, to the processing module 4, a regulated output voltage Vout that is relatively independent of the activity of the processing module 4.

The processing module 4 operates as a load circuit powered by the regulation device 5.

As wireless communications may be activated and deactivated frequently depending on operating conditions and states, the processing module 4 may operate in a first operating mode, hereinafter called what is termed an activity mode MACT when wireless communications are activated, or in a second operating mode, hereinafter called what is termed a standby mode MATT when communications are deactivated.

When the processing module 4 is in its activity mode MACT, a high output current is demanded at the output of the regulation device 5.

By contrast, when the processing module 4 is in its standby mode MATT, the output current of the regulation device 5 is low.

Figure 2:
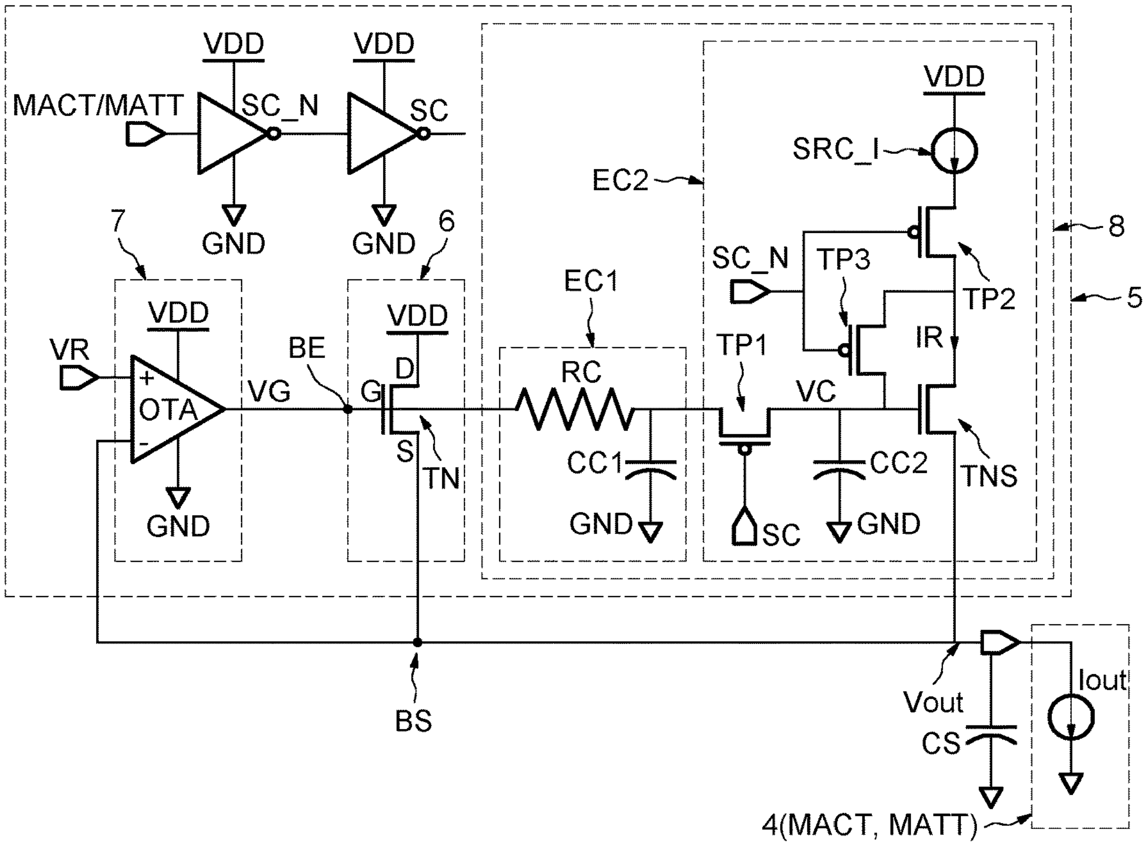
FIG. 2 is a schematic diagram of the low dropout amplifier of FIG. 1.

Reference is now made to FIG. 2 in order to illustrate an exemplary embodiment of the low-dropout voltage regulation device 5.

The regulation device 5 is produced in an integrated manner and comprises a power stage 6, an error amplifier 7 and a compensation circuit 8.

The power stage 6 comprises a pass element, in this case, for example, an NMOS power transistor TN whose source S is coupled to the output terminal BS of the power stage 6, whose drain D is coupled to a supply voltage, in this case the supply voltage VDD of the regulation device 5, and whose gate G is coupled to the input terminal BE of the power stage 6.

The output terminal BS of the device 5 is coupled to an output cutoff capacitor CS and to the processing module 4, hereinafter called the load circuit 4 of the regulation device 5.

The power stage 6 is intended to receive a gate voltage VG on the input terminal BE and is configured to deliver, to the output terminal BS, an output voltage Vout and an output current Iout depending on the gate voltage VG.

The error amplifier 7 includes a first input coupled to a reference voltage source (not illustrated in FIG. 2) that is configured to deliver a reference voltage VR, a second input coupled to the output terminal BS of the power stage 6, and an output coupled to the input terminal BE of the power stage 6.

The error amplifier 7 is configured to compare the output voltage Vout and the reference voltage VR, and deliver, to the input terminal BE, the gate voltage VG depending on the result of the comparison between the output voltage Vout and the reference voltage VR, so as to compensate variations in the output voltage Vout.

The compensation circuit 8 is coupled to the input terminal BE and is configured to speed up the compensation in the gate voltage VG, so as to reduce the durations of transient responses to variations in the load value of the load circuit 4.

The compensation circuit 8 includes a first compensation stage EC1 including a compensation resistor RC and a first compensation capacitor CC1 that are coupled in series between the input terminal BE and ground GND.

It should be noted that the compensation resistor RC is a resistor that is placed in series with the first compensation capacitor CC1, and the value of the first compensation capacitor CC1 is tailored for compensating the transient response to the variations in the load value of the load circuit 4 upon the change from standby mode MATT to activity mode MACT and for regulating stability of the regulation device 5 in activity mode MACT.

The compensation circuit 8 furthermore includes a second compensation stage EC2 coupled in parallel with the first compensation capacitor CC1 and configured to be driven by a control signal SC representative of the operating mode of the load circuit 4 and a complementary control signal SC_N that is the complementary signal of the control signal SC.

By way of example, this control signal SC may be emitted by the load circuit 4 itself or by an auxiliary circuit that is able to drive the load circuit 4.

By way of example, this control signal SC may be an ‘on’/‘off’ signal that is intended to activate or stop the load circuit 4.

In other words, when the load circuit 4 is in its activity mode MACT, the control signal SC is in the high state, that is to say in its ‘on’ state, and the complementary control signal SC_N is in the low state.

When the load circuit 4 is in its standby mode MATT, the control signal SC is in the low state, that is to say in its ‘off’ state, and the complementary control signal SC_N is in the high state.

The second compensation stage EC2 includes at least one second capacitor CC2 and is configured when the control signal SC and the complementary signal SC_N are in the high state and the low state, respectively, to be disconnected from the input terminal BE and precharge an initial compensation voltage VC, and when the control signal SC and the complementary control signal SC_N are in the low state and the high state, respectively, to be coupled to the input terminal BE via the compensation resistor RC and deliver, to the input terminal BE, the initial compensation voltage VC, so as to reduce or even cancel out the transient response to the variations in the load value of the load circuit 4 upon the change from activity mode MACT to standby mode MATT.

The value of the at least one second capacitor CC2 is configured to help ensure, in combination with the value of the first capacitor CC1, the regulation stability of the regulation device 5 in standby mode MATT.

It should be noted that the use of the first and second compensation stages EC1, EC2 allows not only frequency compensation so as to stabilize the regulation of the regulation device, but also a reduction or even cancelling out of the transient response upon the change from activity mode MACT to standby mode MATT.

Specifically, when the load circuit 4 is in standby mode MATT, the output current Tout delivered to the output of the power stage 6 is a leakage current of the load circuit 4.

The gate voltage VG applied to the input terminal BE, in other words the gate G of the transistor TN, is therefore equal to the sum of the reference voltage VR and a gate-source voltage of the transistor TN generating the leakage current. This gate-source voltage is, in this case, of the order of the threshold voltage Vth of the transistor TN.

On account of this, the initial compensation voltage VC, applicable to the input terminal BE, is configured to be of the order of the sum of the reference voltage VR and the threshold voltage Vth of the transistor TN.

In other words, with this initial compensation voltage VC applied to the input terminal BE, the power stage 6 is tailored to deliver, to the output terminal BS, the reference voltage VR and the output current Tout close to the leakage current of the load circuit 4 as soon as the load circuit 4 is in its standby mode MATT.

Therefore, the variation in the output voltage Vout brought about by the variation in the output current Tout upon the change from activity mode MACT to standby mode MATT may be compensated virtually instantaneously.

The second compensation stage EC2 includes a second compensation capacitor CC2 coupled in parallel with the first compensation capacitor CC1 via a first PMOS transistor TP1 whose gate is intended to receive the control signal SC, and an additional NMOS transistor TNS having a structure identical to the power transistor TN or having a channel length/channel width ratio identical to that of the transistor TN. The additional NMOS transistor TNS has its source coupled to the output terminal BS, its drain coupled to a current source SRC_I via a second PMOS transistor TP2, and its gate coupled to the second compensation capacitor CC2 and fed back to the drain of the additional transistor TNS via a third PMOS transistor TP3.

The gates of the second and third transistors TP2 and TP3 are intended to receive the complementary control signal SC_N and the current source SRC_I is configured to deliver a reference current IR on the order of the leakage current of the load circuit 4 in standby mode MATT. The structure of the current source SRC_I may, for example, be produced in the form of a current mirror.

Upon the change from standby mode MATT to activity mode MACT, the transistor TP1 will be in the off state, as the control signal SC will be in the high state. The transistors TP2 and TP3 will be in the on state, as the complementary control signal SC_N will be in the low state.

Therefore, the additional transistor TNS is in the on state and delivers, to its source, the reference current IR. As the additional transistor TNS is identical to the power transistor TN or has a channel length/channel width ratio identical to that of the transistor TN, the gate voltage of the additional transistor TNS is also on the order of the sum of the reference voltage VR and the threshold voltage Vth of the transistor TN.

The second compensation capacitor CC2 is therefore charged up to the gate voltage during activity mode MACT.

Upon the change from activity mode MACT to standby mode MATT, the first transistor TP1 is in the on state and the second and third transistors TP2 and TP3 are in the off state due to the control signals SC and SC_N.

In other words, the second compensation capacitor CC2 is coupled to the input terminal BE via the compensation resistor RC. The initial compensation voltage VC charged onto the second compensation capacitor CC2 is applied directly to the input terminal BE so as to allow the transistor TN to quickly generate the output voltage Vout and the output current Tout that are tailored to the load circuit 4 in standby mode MATT.

On account of this, when the load circuit 4 is in activity mode MACT, the first compensation stage EC1 is configured to attenuate the variations in the voltage at the output terminal BS on its own, and the second compensation stage EC2 is decoupled from the input terminal BE and configured to precharge the initial compensation voltage VC on the order of the sum of the reference voltage VR and the threshold voltage Vth of the transistor TN.

When the load circuit 4 is again in standby mode MATT, the second compensation stage EC2 is coupled again to the input terminal BE so as to apply the initial compensation voltage VC to the gate of the transistor TN.

Advantageously, the second compensation stage EC2 is driven by the control signal SC and the complementary control signal SC_N, making it possible to make the reference current source SRC_I and the additional transistor TNS operate in activity mode MACT, so as to reduce the consumption of the second compensation stage EC2.

Figure 3:
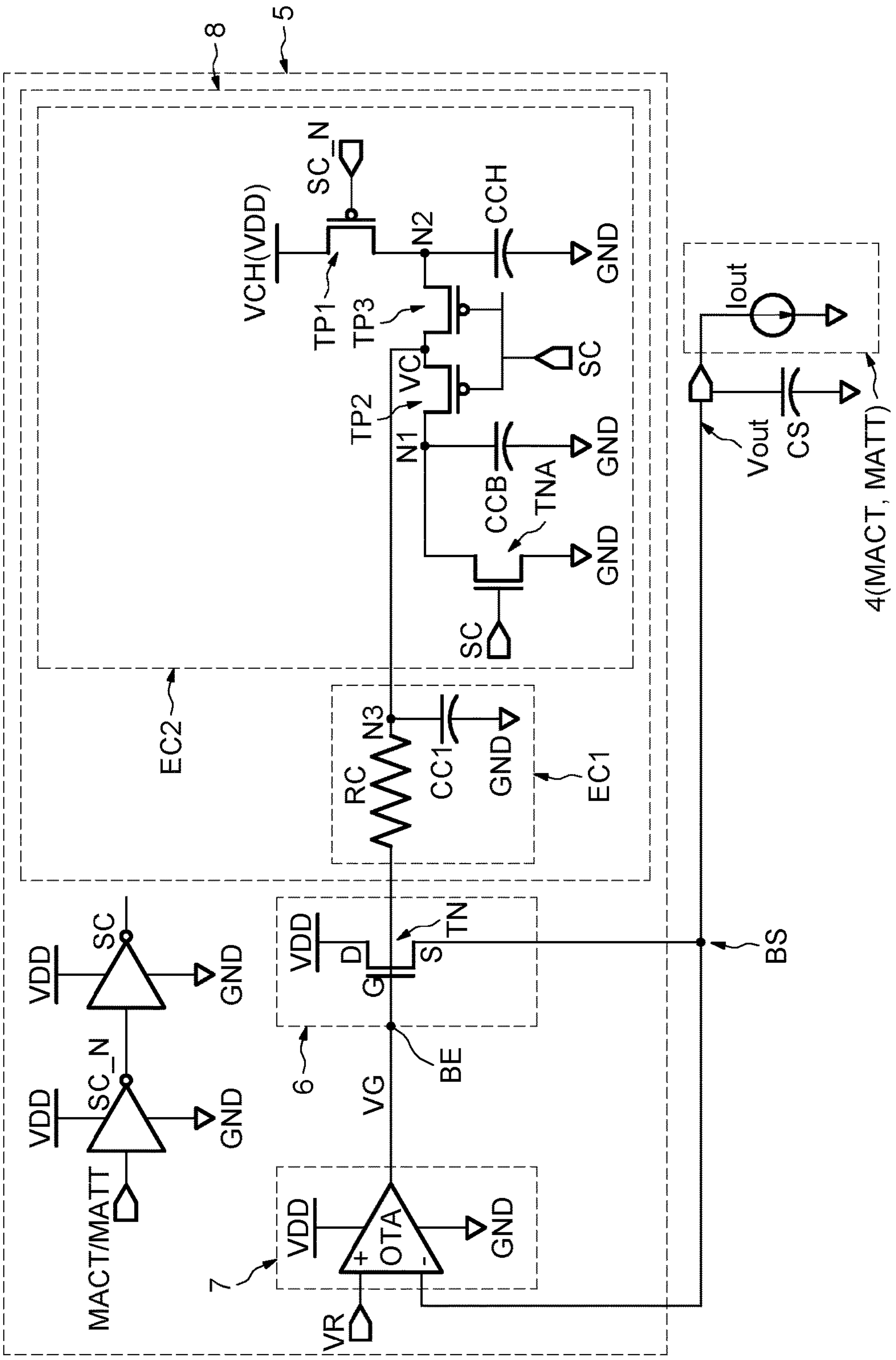
FIG. 3 is a schematic diagram of another embodiment of the low dropout amplifier of FIG. 1.

Reference is now made to FIG. 3 in order to illustrate another exemplary embodiment of the low-dropout voltage regulation device 5.

In this example, the power stage 6, the error amplifier 7, the load circuit 4 and the first compensation stage EC1 of the compensation circuit 8 are identical to those illustrated in FIG. 2.

By contrast, the second compensation stage EC2 illustrated in FIG. 3 comprises a 'low-side' capacitor CCB coupled between a first node N1 and ground GND, an auxiliary NMOS transistor TNA coupled to the first node N1 and supplied by the ground voltage GND, a 'high-side' capacitor CCH coupled between a second node N2 and ground GND, and a first PMOS transistor TP1 coupled to the second node N2 and supplied by a charging voltage VCH, in this case for example the supply voltage VDD of the regulation device 5. The second compensation stage EC2 further comprises a second PMOS transistor TP2 coupled between the first node N1 and a third node N3 linked between the compensation resistor RC and the first compensation capacitor CC1, and a third PMOS transistor TP3 coupled between the second node N2 and the third node N3.

The gates of the transistors TNA, TP2 and TP3 are intended to receive the control signal SC, and the gate of the transistor TP1 is intended to receive the complementary control signal SC_N.

When the load circuit 4 is in activity mode MACT, in other words the control signal SC is in the high state and the complementary control signal SC_N is in the low state, the transistors TNA and TP1 are in the on state and the transistors TP2 and TP3 are in the off state, so as to allow the second compensation stage EC2 to be decoupled from the first compensation stage EC1 and to precharge an initial compensation voltage VC by charging the low-side and high-side capacitors CCB and CCH.

More precisely, the low-side capacitor CCB is charged up to the ground voltage GND and the high-side capacitor CCH is charged up to the supply voltage VDD.

When the load circuit 4 enters standby mode MATT, in other words the control signal SC is in the low state and the complementary control signal SC_N is in the high state, the transistors TNA and TP1 are in the off state and the transistors TP2 and TP3 are in the on state, so as to allow the second compensation stage EC2 to be coupled to the first compensation stage EC1 via the third node N3 and to apply the initial compensation voltage VC to the input terminal BE.

The initial compensation voltage VC on the third node N3 in standby mode MATT is equal to VDD*CCH/(CCB+CCH). In order to obtain a voltage VG of the gate G of the transistor TN that is tailored to the load circuit 4 in standby mode MATT, the initial compensation voltage VC is configured to be on the order of the sum of the reference voltage VR and the threshold voltage Vth of the transistor TN.

Specifically, the value of the equivalent compensation capacitor CCE in activity mode MACT is equal to that of the first compensation capacitor CC1, and the value of the equivalent compensation capacitor CCE in standby mode MATT is equal to the sum of the values of the capacitors CC1, CCB and CCH.

In order to make the regulation device 5 stable when the load circuit 4 is in activity mode MACT or standby mode MATT, a pole-zero cancellation is used adaptively for activity mode MACT and standby mode MATT. We therefore have $$\frac{gm_{TN}}{gm_{TN}+sCS}=\frac{g_C}{g_C+sCCE}$$

where $gm_{TN}$ is the transconductance of the transistor TN, and $g_c$ is the conductance of the compensation resistor RC.

By approximation we obtain, for activity mode MACT $$\frac{gm_{TN\_MACT}}{CS}\approx\frac{g_C}{CC1}$$

and for standby mode MATT $$\frac{gm_{TN\_MATT}}{CS}\approx\frac{g_C}{CC1+CCB+CCH}$$

Taking the initial compensation voltage VC=VDD*CCH/(CCB+CCH) equal to VR+Vth, it is then possible to obtain $$CCH\approx\frac{g_c}{gm_{TN-MATT}}\left(\frac{VR+Vth}{VDD}\right)CS \text{ and } CCB\approx\frac{g_C}{gm_{TN-MATT}}\left(1-\frac{VR+Vth}{VDD}\right)CS$$

On account of this, the values of the compensation capacitors CCB and CCH are configured to precharge the initial compensation voltage VC when the load circuit 4 is in activity mode MACT, and apply the initial compensation voltage VC to the input terminal BE when the load circuit 4 is in standby mode MATT.

Figure 4:
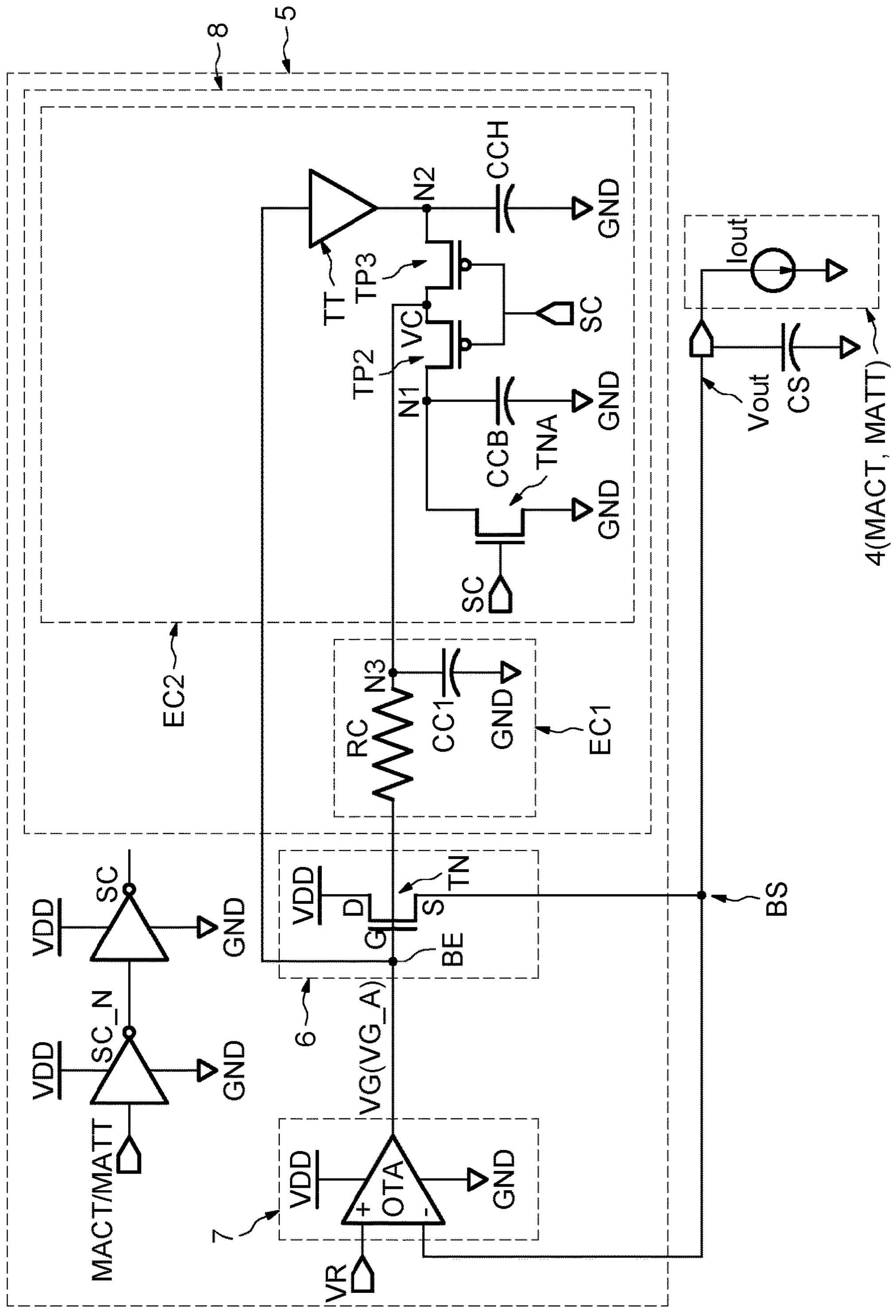
FIG. 4 is a schematic diagram of yet another embodiment of the low dropout amplifier of FIG. 1.

As a variant, reference is made to FIG. 4 in order to illustrate yet another exemplary embodiment of the low-dropout voltage regulation device 5.

The first PMOS transistor TP1 illustrated in FIG. 4 is coupled to the second node N2 and supplied by a voltage buffer TT instead of the supply voltage VDD illustrated in FIG. 3. The other components of the low-dropout voltage regulation device 5 are similar to those in the example illustrated in FIG. 3.

The voltage buffer TT is in this case, for example, a voltage buffer amplifier and coupled between the input terminal BE and the second node N2 so as to deliver, to the second node N2, the gate voltage VG_A present at the input terminal BE when the load circuit 4 is in activity mode MACT.

In other words, when the load circuit 4 is in activity mode MACT, the low-side capacitor CCB is charged up to the ground voltage GND and the high-side capacitor CCH is charged up to the gate voltage VG_A present at the input terminal BE when the load circuit 4 is in activity mode MACT.

In order to obtain the initial compensation voltage VC=VG_A*CCH/(CCB+CCH) equal to VR+Vth, it is then possible to calculate the values of the low-side CCB and high-side capacitors as follows:

$$CCH\approx\frac{g_c}{gm_{TN-MATT}}\left(\frac{VR+Vth}{\text{VG\_A}}\right)CS \text{ and } CCB\approx\frac{g_C}{gm_{TN-MATT}}\left(1-\frac{VR+Vth}{\text{VG\_A}}\right)CS.$$

The invention claimed is:

1. A low-dropout voltage regulation device, comprising:

a power stage having an output terminal configured to be coupled to a load circuit, the load circuit being operable in a plurality of operating modes, the load circuit being configured to receive a different respective output current when in each of the plurality of operating modes;

an error amplifier having an output coupled to an input terminal of the power stage; and a compensation circuit coupled to the input terminal of the power stage, wherein the compensation circuit is operable in a plurality of selectable configurations that are respectively tailored to the plurality of operating modes, the plurality of selectable configurations being selectable in response to a control signal representative of a current operating mode of the load circuit;

wherein the plurality of operating modes of the load circuit include a first operating mode in which the load circuit is intended to receive a first output current and a second operating mode in which the load circuit is intended to receive a second output current;

wherein the plurality of selectable configurations of the compensation circuit include a first configuration tailored to the first operating mode of the load circuit and a second configuration tailored to the second operating mode of the load circuit;

wherein in the first configuration, the compensation circuit is configured to attenuate variations in voltage at the output terminal of the power stage that occur upon a change from the second operating mode to the first operating mode, and to precharge an initial compensation voltage able to be usable upon change from the first operating mode to the second operating mode;

wherein in the second configuration, the compensation circuit is configured to apply the initial compensation voltage to the input terminal of the power stage upon the change from the first operating mode to the second operating mode;

wherein the compensation circuit comprises:

a first compensation stage including a compensation resistor and a first compensation capacitor that are coupled in series between the input terminal of the power stage and ground, the first compensation capacitor having a capacitance value that smooths variations in the voltage at the output terminal of the power stage that occur upon the change from the second operating mode to the first operating mode; and a second compensation stage comprising at least one second compensation capacitor and being configured:

in the first configuration, to be electrically disconnected from the input terminal of the power stage at all times when operating in the first configuration and to charge the at least one second compensation capacitor so as to precharge the initial compensation voltage, and in the second configuration, to be electrically coupled to the input terminal of the power stage and deliver, to the input terminal, the initial compensation voltage;

wherein the power stage includes a power transistor having a gate is coupled to the input terminal of the power stage;

wherein the error amplifier includes a first input coupled to a reference voltage and a second input coupled to a conduction terminal of the power transistor, and the precharged initial compensation voltage is approximately a sum of the reference voltage and a threshold voltage of the power transistor;

wherein the power transistor of the power stage is an n-channel power transistor, and wherein the conduction terminal to which the second input of the error amplifier is coupled comprises a source of the n-channel power transistor.

2. The low-dropout voltage regulation device according to claim 1, wherein the second compensation stage further includes an additional transistor, the second compensation stage includes a single second compensation capacitor coupled between a gate of the additional transistor and ground, and a source and a drain of the additional transistor are coupled, respectively, to the load circuit of the low-dropout voltage regulation device and to a current source configured to deliver, when the control signal is representative of the first operating mode, a reference current of a same order of magnitude as a leakage current of the load circuit in the second operating mode of the load circuit of the low-dropout voltage regulation device.

3. The low-dropout voltage regulation device according to claim 2, wherein the additional transistor is identical to the power transistor.

4. The low-dropout voltage regulation device according to claim 2, wherein the additional transistor has a channel length/channel width ratio identical to that of the power transistor.

5. The low-dropout voltage regulation device according to claim 2, wherein the additional transistor has a channel length/channel width ratio within a given threshold of a channel length/channel width ratio of the power transistor.

6. The low-dropout voltage regulation device according to claim 1, wherein a charging voltage is a supply voltage of the low-dropout voltage regulation device.

7. The low-dropout voltage regulation device according to claim 1, wherein a charging voltage is a voltage present at the input terminal of the power stage when the load circuit is in the first operating mode.

8. The low-dropout voltage regulation device according to claim 1, produced in an integrated manner.

9. The low-dropout voltage regulation device of claim 1, wherein the second compensation stage includes a second compensation capacitor and a third compensation capacitor that are configured, in the first configuration, to receive a charging voltage and ground, respectively, and, in the second configuration, to both be coupled to the input terminal of the power stage.

10. A low-dropout voltage regulation device, comprising:

a power stage having an output terminal configured to be coupled to a load circuit, the load circuit being operable in a plurality of operating modes, the load circuit being configured to receive a different respective output current when in each operating mode of the plurality of operating modes;

an error amplifier having a first input coupled to a reference voltage, a second input, and an output coupled to an input terminal of the power stage; and a compensation circuit comprising:

a first compensation stage comprising an RC filter coupled to the input terminal of the power stage, and generating an initial compensation voltage; and a second compensation stage comprising:

a first transistor coupled between a supply voltage and a high-side capacitor, the first transistor having a control terminal coupled to a complementary control signal;

the high-side capacitor directly electrically connected between the first transistor and ground;

a third transistor directly electrically connected between the initial compensation voltage and the high-side capacitor, the third transistor having a control terminal coupled to a control signal, the complementary control signal being a complement of the control signal, wherein the control signal is representative of a current operating mode of the load circuit;

a second transistor directly electrically connected between the initial compensation voltage and a low-side capacitor, the second transistor having a control terminal coupled to the control signal; and the low-side capacitor directly electrically connected between the second transistor and ground.

11. The low-dropout voltage regulation device of claim 10, wherein the control signal is at a logic high when the load circuit is in a first operation mode, the first operation mode being an activity mode; and wherein the control signal is at a logic low when the load circuit is in a second operation mode, the second operation mode being a standby mode.

12. The low-dropout voltage regulation device of claim 11, wherein the RC filter comprises:

a compensation resistor and a first compensation capacitor that are coupled in series between the input terminal of the power stage and ground, the first compensation capacitor having a capacitance value that smooths variations in a voltage at an output terminal of the power stage that occur upon change from a second of the operating modes to a first of the operating modes.

13. The low-dropout voltage regulation device of claim 12, wherein the power stage includes a power transistor having a gate that is coupled to the input terminal of the power stage; wherein the second input of the error amplifier is coupled to a conduction terminal of the power transistor, and wherein the initial compensation voltage is approximately a sum of the reference voltage and a threshold voltage of the power transistor.

14. The low-dropout voltage regulation device of claim 10, produced in an integrated manner.

15. A low-dropout voltage regulation device, comprising:

a power stage having an output terminal configured to be coupled to a load circuit, the load circuit being operable in a plurality of operating modes, the load circuit being configured to receive a different respective output current when in each operating mode of the plurality of operating modes;

an error amplifier having a first input coupled to a reference voltage, a second input, and an output coupled to an input terminal of the power stage; and a compensation circuit comprising:

a first compensation stage comprising an RC filter coupled to the input terminal of the power stage, and generating an initial compensation voltage; and a second compensation stage comprising:

a buffer having an input coupled to the input terminal of the power stage;

a high-side capacitor directly electrically connected between an output of the buffer and ground;

a third transistor having first conduction terminal directly electrically connected to the RC filter and a second conduction terminal directly electrically connected to the output of the buffer, the third transistor having a control terminal coupled to a control signal, wherein the control signal is representative of a current operating mode of the load circuit;

a second transistor having a first conduction terminal directly electrically connected to the first conduction terminal of the third transistor and a second conduction terminal directly electrically connected to a low-side capacitor, the second transistor having a control terminal coupled to the control signal;

wherein the low-side capacitor is directly electrically connected between the second conduction terminal of the second transistor and ground.

16. The low-dropout voltage regulation device of claim 15, wherein the control signal is at a logic high when the load circuit is in a first operation mode, the first operation mode being an activity mode; and wherein the control signal is at a logic low when the load circuit is in a second operation mode, the second operation mode being a standby mode.

17. The low-dropout voltage regulation device of claim 16, wherein the RC filter comprises:

a compensation resistor and a first compensation capacitor that are coupled in series between the input terminal of the power stage and ground, the first compensation capacitor having a capacitance value that smooths variations in a voltage at an output terminal of the power stage that occur upon change from the second operating mode to the first operating mode.

18. The low-dropout voltage regulation device of claim 17, wherein the power stage includes a power transistor having a gate that is coupled to the input terminal of the power stage; wherein the second input of the error amplifier is coupled to a conduction terminal of the power transistor, and wherein the initial compensation voltage is approximately a sum of the reference voltage and a threshold voltage of the power transistor.

19. The low-dropout voltage regulation device of claim 15, produced in an integrated manner.

* * * * *